Dec. 23, 1952  S. B. VALIULIS  2,622,461
WIRE STRIPPER
Filed June 14, 1948  2 SHEETS—SHEET 1
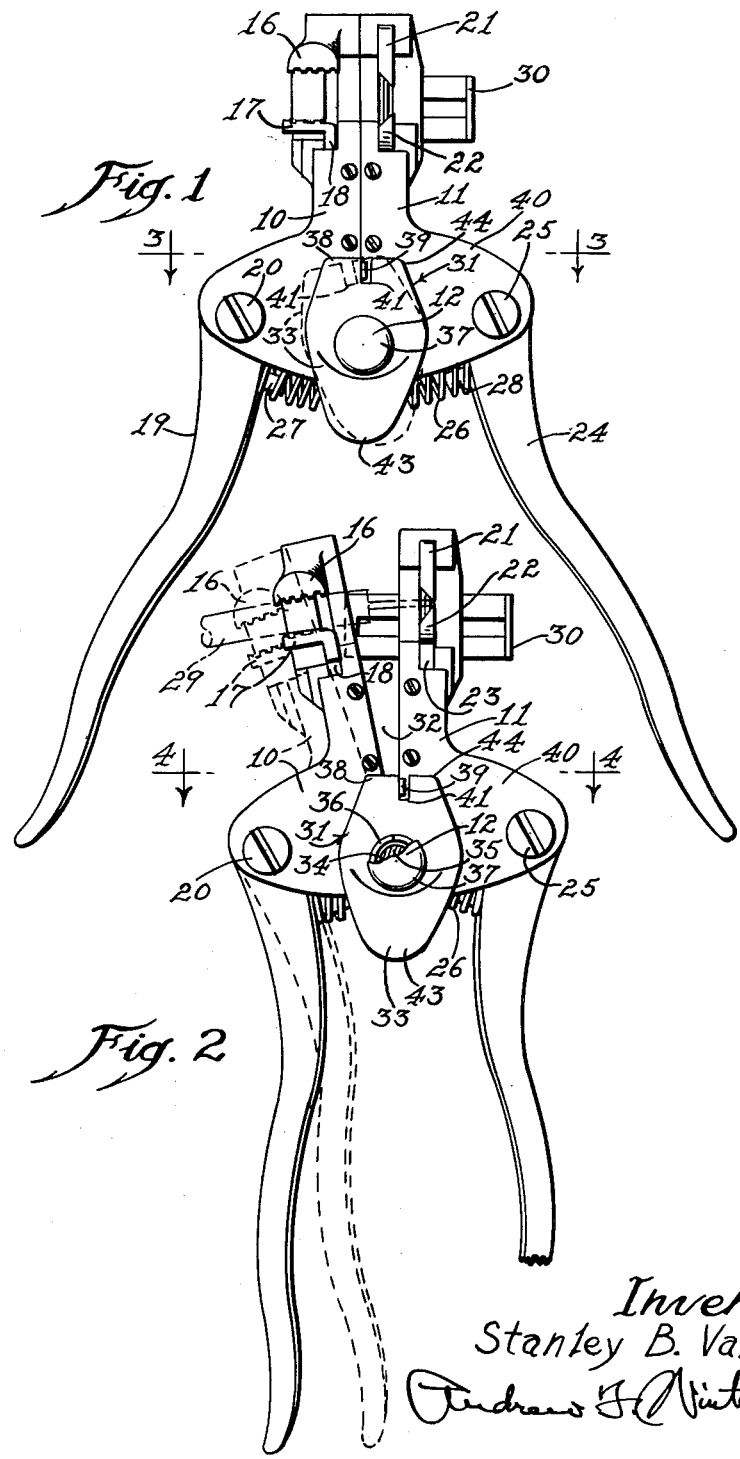
Inventor:
Stanley B. Valiulis Dec. 23, 1952 S. B. VALIULIS 2,622,461
WIRE STRIPPER
Filed June 14, 1948 2 SHEETS—SHEET 2

Inventor:
Stanley B. Valiulis
Andrew J. Wintercorn
Atty.

Patented Dec. 23, 1952

2,622,461

UNITED STATES PATENT OFFICE 2,622,461

WIRE STRIPPER

Stanley B. Valiulis, Rockford, Ill., assignor to General Cement Mfg. Co., Rockford, Ill., a corporation of Illinois Application June 14, 1948, Serial No. 32,940

9 Claims. (Cl. 81—9.5)

This invention relates to an improved hand tool for stripping insulation from insulated wire, and is more particularly concerned with improvements in wire strippers of the type disclosed in Wood Patent 2,313,793.

The wire stripper of the Wood patent has on one hinged half of the body of the tool one pair of jaws for clamping the wire which are closed by hand pressure on one of the handles in the closing thereof against the action of a return spring, and there is also a stripper blade movable similarly on the other hinged half of the body of the tool by hand pressure on the other of the pair of handles. With that arrangement, after the handles start to close, the wire is first gripped between the jaws, and the stripper blades upon further closing movement of the handles come together to partially cut through the insulation, and, finally, as the handles are brought together, the hinged halves of the body of the tool are spread apart so as to strip off the partially severed end portion of insulation from the wire. Due to the fact that the wire at the end of the stripping operation is still held between the clamping jaws and the stripper blades, the wire is quite apt to be crushed if the hinged halves of the body of the tool are allowed to close again under action of the return spring when the handles are released. I am aware that efforts have been made to remedy this difficulty, but the means proposed have, in my opinion, been far too complicated and expensive, considering the selling price at which it is desired to make tools of this kind available. It is, therefore, the principal object of my invention to provide in connection with the hinged halves of the body of the tool a catch, which will automatically engage between these halves in the opening thereof during a wire stripping operation, so as to prevent the subsequent closing thereof until the catch is manually released.

It is a further object of my invention to provide a catch of the kind mentioned which may be easily shifted to an inoperative out-of-the-way position when not needed, as, for example, when stripping insulation from heavy wire that is not apt to be crushed.

It is a still further object of my invention to provide a catch of the kind mentioned in which the tooth engageable between the hinged halves of the body of the tool is of stepped form, so that the catch will be effective like a ratchet to hold the tool at least part way open, in the event the handles should not be fully closed so as to make the catch fully effective.

The invention is illustrated in the accompanying drawings, in which—

Fig. 1 is a face view of a wire stripper embodying the improvements of my invention, the catch being shown in full lines in its normal operative position and in dotted lines in its shifted inoperative or out-of-the-way position;

Fig. 2 is another face view of the tool, showing in full lines the minimum extent to which the catch serves to hold the tool open to prevent crushing of the wire, and indicating in dotted lines the full extent to which the catch is capable of holding the tool open;

Fig. 5 is a section like Fig. 4, but showing the catch all the way in;

The same reference numerals are applied to corresponding parts throughout the views.

Figure 8:
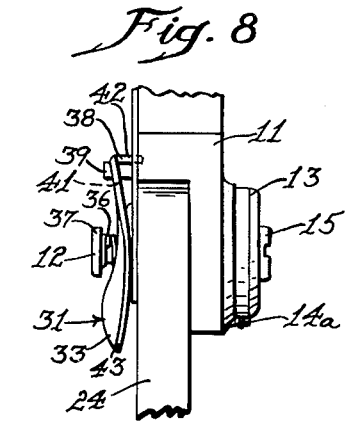
Figure 9:
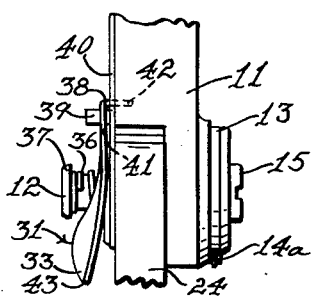

Referring first mainly to Figs. 1 and 2, the wire stripper comprises a pair of generally L-shaped body halves 10 and 11, which are hingedly connected by a pin 12. Enclosed under a cap 13 on the back of the tool is a torsion spring 14 in coaxial relation to the pivot pin 12 and anchored at its opposite ends to the two body halves tending to close the same, one anchored end of the torsion spring 14 being indicated at 14a in Figs. 7 to 9. The cap 13 is held in place on the back of the tool by means of a screw 15 threaded in an axial hole in the rear end of the pivot pin 12. The body member 10 carries the wire clamping jaws, consisting of a stationary jaw 16 and a movable jaw 17, the movable jaw 17 having a slidable shank portion 18 guided in the member 10 and suitably operatively connected in the lower portion of member 10 with the handle 19 that is pivoted at 20 to member 10. The body member 11, on the other hand, carries the wire stripping means, consisting of a stationary stripper blade 21 and a movable stripper blade 22, the latter having a shank portion 23 suitably guided in member 11, and suitably operatively connected in the lower portion of member 11 with the other handle 24 that is pivotally connected at 25 to member 11. A coiled compression spring 26 is mounted at its opposite ends on projections 27 and 28 provided on the inner sides of the handles 19 and 24, respectively, and tends normally to urge said handles apart. The construction of the tool as thus far described corresponds to what is disclosed in Wood Patent 2,313,793, and it is believed, therefore, that there is no need to go into these details more fully, beyond stating that in the operation of the tool the torsion spring 14 will serve to hold the body members 10 and 11 together, namely, in closed position, while the handles 19 and 24 are being closed part way to grip the wire 29 between the jaws 16 and 17 and to cut through, or at least partially through, the insulation with the blades 21—22. Then, after this first stage of the operation of the tool has been completed, further closing movement of the handles 19 and 24 serves to spread the body members 10 and 11 apart, swinging the same about their common pivot 12 to the position shown partly in full lines and partly in dotted lines in Fig. 2, in which relative movement of the body members the severed, or partially severed, end portion of the insulation is pushed off the end of the wire as the wire, gripped between the jaws 16 and 17, is pulled away from the stripper blades 21—22. A slidably adjustable stop 30 is provided on the body member 11 to predetermine the length of insulation to be cut and stripped off by means of the jaws 21—22, it being obvious that if the end portion of the wire, when placed in the tool preparatory to the stripping operation, is placed with its end in abutment with the stop 30 will have only that length of insulation stripped off measurably between the cutting edges of blades 21—22 and stop 30. Of course, if the operator purposely places the wire in the tool short of the stop 30, a shorter length of insulation will be cut and stripped off.

Figure 3:
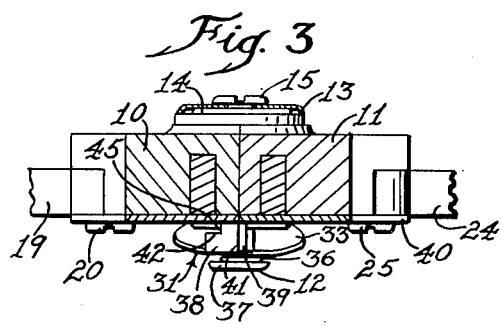
Figs. 3 and 4 are horizontal sections on the correspondingly numbered lines of Figs. 1 and 2, respectively, Fig. 4 showing the catch in its partway-in position.
Figure 4:
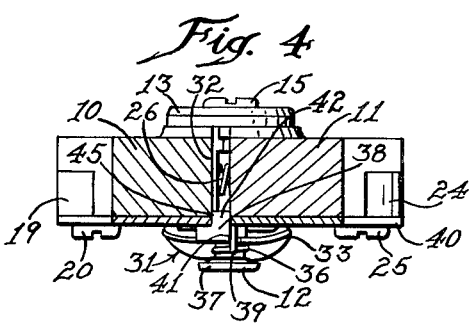
Figure 5:
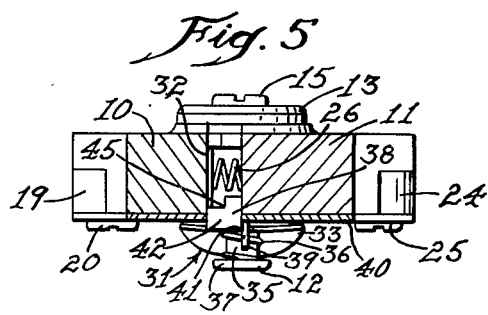
Figure 6:
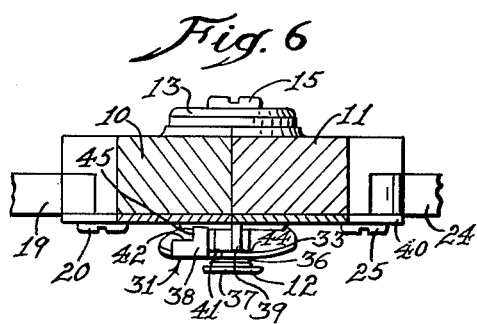
Fig. 6 is a section like Fig. 3, but showing the catch turned to an out-of-the-way inoperative position.
Figure 7:
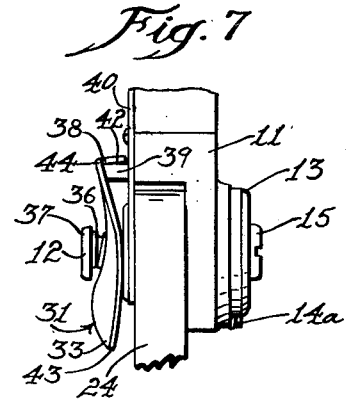
Fig. 7 is a side view of that portion of the tool including the catch, showing the catch shifted to the out-of-the-way inoperative position of Fig. 6, and Figs. 8 and 9 are side views similar to Fig. 7, but showing the catch in its operative position in both views, part way in in Fig. 8, the same as in Fig. 4, and all the way in in Fig. 9, the same as in Fig. 5.

In accordance with my invention, a catch, indicated generally by the reference numeral 31, is provided pivotally and oscillatably mounted on the front end portion of the pivot pin 12 to engage in the crotch 32 between the body members 10 and 11, to hold these members apart at the end of a wire stripping operation, the catch being in the form of an oblong sheet metal plate 33 having a center hole 34 therein loosely receiving the shank 35 of the outer end portion of the pin 12, and being urged toward operative position by a coiled compression spring 36, which encircles the shank portion of the pin 12 between its head 37 and the plate 32 and is compressed enough to insure instant engagement of its inwardly bent toothed end 38 in the crotch 32, when the body members 10 and 11 are spread apart far enough toward the close of the wire stripping operation. A guide lug 39 is bent forwardly from the inner edge portion of the front cover plate 40 on member 11 alongside the crotch 32, and has an easy working fit in a slot 41 provided in the toothed end of the catch plate 33 next to the tooth 42, whereby to hold the catch plate against turn-out out of operative position and guide the toothed end 38 forward, so that the tooth 42 will enter the crotch 32 the instant the members 10 and 11 have been spread far enough apart for that to happen. The same lug 39 is also adapted to serve to hold the catch plate 33 in an inoperative out-of-the-way position in retracted relation to the body members 10 and 11, as shown in Figs. 6 and 7 and in dotted lines in Fig. 1. To move the catch plate 33 to this retracted inoperative position, the tail end portion 43 is depressed enough to lift the toothed end 38 clear of the outer end of the lug 39, whereupon the plate is turned slightly in a counter-clockwise direction, bringing the slot 41 out of register with and at an acute angle relative to the lug 39, so that when the pressure on the tail end 43 is relieved, the toothed end 38 will be held under spring pressure in contact with the outer end of the lug 39 in the retracted inoperative position. The corner portion 44 of the plate 33 is bent inwardly just enough to define a stop shoulder on the toothed end of the catch plate 33, to limit the counter-clockwise turning of the plate by abutment with the side of the lug 39 when the plate is in the retracted inoperative position. It takes only a slight lateral pressure on the tail end 43 of the plate to move it back to the operative position with the lug 39 engaged in the slot 41. In passing, attention is called to the fact that the tooth 42 is shown in Figs. 3 to 6 as of stepped form, and, although only one step is shown, it is obvious that two, or even more, could be provided, if desired, with a view to having the catch engage progressively farther and farther into the crotch 32 the farther the body members 10 and 11 are spread apart. However, as is clearly shown in Figs. 4 and 5, it is sufficient to have only the one stop formation on the tooth 42, by making the single right angle notch 45 in the tooth 42, so that the tool will be held at least half way open, if not fully open, the half open condition being illustrated in Fig. 4 and the fully opened condition in Fig. 5. In actual practice, I have found that it is satisfactory to have the tool held open only to the extent shown in full lines in Figs. 2 and 4, and that it is not necessary to provide for the fully opened condition, shown in dotted lines in Fig. 2 and in full lines in Fig. 5. Hence, if the tooth 42 is made a trifle wider than appears in Fig. 4, so that it is too wide to enter the crotch 32, even when opened to the full extent shown in Fig. 5, it is obvious that the tool will always be held open on each stripping operation only to the extent shown in Fig. 4.

The operation of the catch 31 is believed to be clear from the foregoing description. The operator holding the handles 19 and 24 in one hand and closing them to perform the stripping operation will find that he has his thumb close enough to the tail end 43 of the catch plate 33 to depress it easily in order to release the catch after it has functioned automatically at the end of a stripping operation by engagement in the crotch 32 to hold the body members 10 and 11 apart. The tool is, therefore, instantly made ready for the next stripping operation, and the operator is never conscious of any annoyance in the operation of the tool as a result of the presence of this catch 31. It operates positively every time to prevent crushing or bending of the stripped end of the wire. If the operator fails to close the handles all the way in a given operation of the tool, the catch will act like a ratchet and drop in at least to the extent shown in Fig. 4, to avoid any objectionable bending or crushing of the stripped end of the wire. On the other hand, if the operator is working with larger wire or cable, which is stiff enough to resist crushing or bending, he can instantly depress and turn the catch plate to the inoperative out-of-the-way position, shown in Figs. 6 and 7 and in dotted lines in Fig. 1, after which the tool will function the same as it would if there were no catch on it. It is believed manifest from the above description that this catch is of such simple and economical construction that it adds very little to the overall cost of production of the tool.

It is believed the foregoing description conveys a good understanding of the objects and advantages of my invention. The appended claims have been drawn to cover all legitimate modifications and adaptations.

I claim:

1. In a hand operable tool for stripping insulation from wire comprising a pair of hingedly connected body members, one carrying a pair of relatively movable wire clamping jaws and the other a pair of relatively movable wire stripping jaws to grip the wire and cut through the insulation thereof, whereby when the hinged body members are moved apart the cut section of insulation is stripped from the wire, a manually operable handle pivoted on each of said body members and operatively connected with the movable one of the pair of jaws thereon, and spring means yieldably urging said handles apart so as to close said hingedly connected body members, a spring pressed catch having a tooth that projects into the crotch between and engages the hingedly connected body members when they are spread apart in the wire stripping operation, said catch being pivotally and oscillatably mounted on the body members on their hinging axis and being rotatable on said axis to enable moving said tooth to an out-of-the-way position.

2. In a hand operable tool for stripping insulation from wire comprising a pair of hingedly connected body members, one carrying a pair of relatively movable wire clamping jaws and the other a pair of relatively movable wire stripping jaws to grip the wire and cut through the insulation thereof, whereby when the hinged body members are moved apart the cut section of insulation is stripped from the wire, a manually operable handle pivoted on each of said body members and operatively connected with the movable one of the pair of jaws thereon, and spring means yieldably urging said handles apart so as to close said hingedly connected body members, a spring pressed catch having a tooth that projects into the crotch between and engages the hingedly connected body members when they are spread apart in the wire stripping operation, said catch being pivotally and oscillatably mounted on the body members on their hinging axis and being rotatable on said axis to enable moving said tooth to an out-of-the-way position, the tool further including an outwardly projecting guide lug on one of the body members normally engaging in a slot provided therefor in the catch, to prevent rotation of the catch from operative position and guide said tooth into the crotch, said lug being also adapted to serve to hold the catch in a retracted out-of-the-way position with respect to the body members when the catch is turned so as to move the slotted portion thereof out of register with the lug.

3. In a hand operable tool for stripping insulation from wire comprising a pair of hingedly connected body members, one carrying a pair of relatively movable wire clamping jaws and the other a pair of relatively movable wire stripping jaws to grip the wire and cut through the insulation thereof, whereby when the hinged body members are moved apart the cut section of insulation is stripped from the wire, a manually operable handle pivoted on each of said body members and operatively connected with the movable one of the pair of jaws thereon, and spring means yieldably urging said handles apart so as to close said hingedly connected body members, a spring pressed catch having a tooth that projects into the crotch between and engages the hingedly connected body members when they are spread apart in the wire stripping operation, said catch being pivotally and oscillatably mounted on the body members on their hinging axis, said tooth being of stepped formation so as to engage part way in the crotch or farther into the crotch, depending on the extent of separation of the body members.

4. In a hand operable tool for stripping insulation from wire comprising a pair of hingedly connected body members, one carrying a pair of relatively movable wire clamping jaws and the other a pair of relatively movable wire stripping jaws to grip the wire and cut through the insulation thereof, whereby when the hinged body members are moved apart the cut section of insulation is stripped from the wire, a manually operable handle pivoted on each of said body members and operatively connected with the movable one of the pair of jaws thereon, and spring means yieldably urging said handles apart so as to close said hingedly connected body members, a spring pressed catch having a tooth that projects into the crotch between and engages the hingedly connected body members when they are spread apart in the wire stripping operation, said catch being pivotally and oscillatably mounted on the body members on their hinging axis and being rotatable on said axis to enable moving said tooth to an out-of-the-way position, said tooth being of stepped formation so as to engage part way in the crotch or farther into the crotch, depending on the extent of separation of the body members, the tool further including an outwardly projecting guide lug on one of the body members normally engaging in a slot provided therefor in the catch to prevent rotation of the catch from operative position and guide said tooth into the crotch, said lug being also adapted to serve to hold the catch in a retracted out-of-the-way position with respect to the body members when the catch is turned so as to move the slotted portion thereof out of register with the lug.

5. In a hand operable tool for stripping insulation from wire comprising a pair of hingedly connected body members, one carrying a pair of relatively movable wire clamping jaws and the other a pair of relatively movable wire stripping jaws to grip the wire and cut through the insulation thereof, whereby when the hinged body members are moved apart the cut section of insulation is stripped from the wire, a manually operable handle pivoted on each of said body members and operatively connected with the movable one of the pair of jaws thereon, and spring means yieldably urging said handles apart so as to close said hingedly connected body members, a spring pressed catch having a tooth that projects into the crotch between and engages the hingedly connected body members when they are spread apart in the wire stripping operation, said catch being oscillatably mounted on the body members on their hinging axis, the tool further including an outwardly projecting guide lug on one of the body members engaging in a slot provided therefor in the catch to prevent rotation of the catch from operative position and guide said tooth into the crotch.

6. In a hand operable tool for stripping insulation from wire comprising a pair of hingedly connected body members, one carrying a pair of relatively movable wire clamping jaws and the other a pair of relatively movable wire stripping jaws to grip the wire and cut through the insulation thereof, whereby when the hinged body members are moved apart the cut section of insulation is stripped from the wire, a manually operable handle pivoted on each of said body members and operatively connected with the movable one of the pair of jaws thereon, and spring means yieldably urging said handles apart so as to close said hingedly connected body members, a spring pressed catch having a tooth that projects into the crotch between and engages the hingedly connected body members when they are spread apart in the wire stripping operation, said catch being oscillatably mounted on the body members on their hinging axis, said tooth being of stepped formation so as to engage part way in the crotch or farther into the crotch, depending on the extent of separation of the body members, the tool further including an outwardly projecting guide lug on one of the body members engaging in a slot provided therefor in the catch to prevent rotation of the catch from operative position and guide said tooth into the crotch.

7. A hand operable tool for stripping insulation from wire comprising, in combination, a pair of hingedly connected body members, one of which carries a fixed clamping element and the other a fixed stripping element, spring means yieldably urging said members toward closed position, movable wire clamping and stripping members for cooperation, respectively, with the aforesaid clamping and stripping elements, manually operable handles pivoted with respect to said body members and operatively connected with the movable wire clamping and stripping members, respectively, to move the same toward and away from the fixed wire clamping and stripping elements and thereafter spread the body members to complete the wire stripping operation, spring means yieldably urging said handles apart, and a spring-pressed catch having a tooth that projects into the crotch between and engages the hingedly connected body members when they are spread apart in the wire stripping operation to interfere with return of the body members to closed position under action of the first spring means, said catch being pivotally and oscillatably mounted on the body members on their hinging axis and being rotatable on said axis to move said tooth to an out-of-the-way position, the tooth being of stepped formation so as to project to a small extent into the crotch or farther into the crotch, depending on the extent of separation of the body members.

8. In a hand operable tool for stripping insulation from wire comprising a pair of hingedly connected body members, one carrying a pair of relatively movable wire clamping jaws and the other a pair of relatively movable wire stripping jaws to grip the wire and cut through the insulation thereof, whereby when the hinged body members are moved apart the cut section of insulation is stripped from the wire, a manually operable handle pivoted on each of said body members and operatively connected with the movable one of the pair of jaws thereon, and spring means yieldably urging said handles apart so as to close said hingedly connected body members, a spring pressed catch having a tooth that projects into the crotch between and engages the hingedly connected body members when they are spread apart in the wire stripping operation, said catch being mounted on said body members between the pivots of said handles and having a portion projecting in the direction of the handles for manual operation by the same hand that grasps said handles and being thumb actuatable to a retracted position against the action of its spring to permit closing of the body members under action of the first mentioned spring means.

9. In a hand operable tool for stripping insulation from wire comprising a pair of hingedly connected body members, one carrying a pair of relatively movable wire clamping jaws and the other a pair of relatively movable wire stripping jaws to grip the wire and cut through the insulation thereof, whereby when the hinged body members are moved apart the cut section of insulation is stripped from the wire, a manually operable handle pivoted on each of said body members and operatively connected with the movable one of the pair of jaws thereon, and spring means yieldably urging said handles apart so as to close said hingedly connected body members, a spring pressed catch having a tooth that projects into the crotch between and engages the hingedly connected body members when they are spread apart in the wire stripping operation, said catch being mounted on said body members between the pivots of said handles for rotation in a plane substantially parallel to said handles and having a portion projecting in the direction of the handles for manual operation by the same hand that grasps said handles, said catch being thumb actuatable to a retracted position against the action of its spring to permit closing of the body members under action of the first mentioned spring means and being also thumb actuatable to turn the same about its axis of rotation to non-interfering relationship to said body members.

STANLEY B. VALIULIS.

REFERENCES CITED

The following references are of record in the file of this patent:

UNITED STATES PATENTS

| Number | Name | Date |
| --- | --- | --- |
| 1,196,322 | Wood | Aug. 29, 1916 |
| 1,488,759 | Loftus | Apr. 1, 1924 |
| 1,566,297 | Williams | Dec. 22, 1925 |
| 1,578,340 | Miller | Mar. 30, 1926 |
| 2,179,581 | Voogd | Nov. 14, 1939 |
| 2,289,597 | Seat | July 14, 1942 |
| 2,313,793 | Wood | Mar. 16, 1943 |
| 2,454,309 | Davis | Nov. 23, 1948 |